United States Patent
Schmidt et al.

(10) Patent No.: US 6,688,618 B2
(45) Date of Patent: Feb. 10, 2004

(54) ROAD NOISE REDUCTION APPARATUS AND METHOD USING SELECTIVE PLACEMENT OF VIBRATION DAMPERS

(75) Inventors: Joseph lynn Schmidt, Milan, MI (US); Randolph Donald Whitney, Allen Park, MI (US); Diana Chen Mastanduno, Keego Harbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 50 days.

(21) Appl. No.: 10/064,126

(22) Filed: Jun. 13, 2002

(65) Prior Publication Data

US 2003/0034624 A1 Feb. 20, 2003

Related U.S. Application Data

(60) Provisional application No. 60/313,181, filed on Aug. 17, 2001.

(51) Int. Cl.⁷ .............................................. B60G 13/00
(52) U.S. Cl. ............................................... 280/124.108
(58) Field of Search ....................... 280/124.108, 5.515; 188/379, 378, 380

(56) References Cited

U.S. PATENT DOCUMENTS

| | | | |
|---|---|---|---|
| 4,907,154 A | * 3/1990 | Yasuda et al. ............... 701/37 |
| 5,000,415 A | 3/1991 | Sandercock ................. 248/550 |
| 5,333,455 A | 8/1994 | Yoshioka ..................... 60/533 |
| 5,525,853 A | 6/1996 | Nye et al. .................... 310/316 |
| 5,551,540 A | * 9/1996 | F orster et al. ............. 188/267 |
| 5,606,503 A | * 2/1997 | Shal et al. ..................... 701/1 |
| 5,645,260 A | 7/1997 | Falangas ..................... 248/550 |
| 5,734,246 A | 3/1998 | Falangas ..................... 318/649 |
| 5,738,434 A | 4/1998 | Sun ............................ 267/219 |
| 6,123,350 A | * 9/2000 | Suzuki ................ 280/124.108 |
| 6,191,519 B1 | 2/2001 | Nye et al. ............. 310/316.01 |
| 6,224,046 B1 | * 5/2001 | Miyamoto ................... 267/281 |
| 6,502,837 B1 | * 1/2003 | Hamilton et al. ......... 280/5.515 |
| 6,598,885 B2 | * 7/2003 | Delorenzis et al. ...... 280/5.507 |

* cited by examiner

*Primary Examiner*—Yvonne Abbott
(74) *Attorney, Agent, or Firm*—Gary A. Smith

(57) ABSTRACT

An active vibration damper, such as a piezoelectric element (310, 400, 604, 800), a magnetostrictive element (510, 902) or a magnetic shaped alloy, is placed at a connection point (102) between a vehicle suspension component and a vehicle body or frame. The vehicle suspension component, for example, a suspension control arm (100) or shock absorber, determines, in part, noise, vibration and harshness (NVH) characteristics of the vehicle. In addition the vehicle suspension component determines steering and handling of the vehicle. Desirable NVH and good steering and handling are at odds; that is, good steering and handling typically requires a compromise in NVH characteristics. By virtue of the selective placement of vibration dampers in accordance with the invention, good steering and handling are achieved without sacrificing NVH characteristics.

19 Claims, 7 Drawing Sheets

ROAD NOISE REDUCTION APPARATUS AND METHOD USING SELECTIVE PLACEMENT OF VIBRATION DAMPERS

CROSS-REFERENCE TO RELATED APPLICATIONS

The present invention is related to and claims priority to U.S. provisional application serial No. 60/313,181, filed Aug. 17, 2001, by Joseph Lynn Schmidt, et al, entitled Road Noise Reduction Apparatus and Method Using Selective Placement of Vibration Dampers, the disclosure of which is hereby incorporated by reference.

BACKGROUND OF THE INVENTION

1. Field of the Invention

The present invention relates generally to improvement of noise, vibration and harshness (NVH) characteristics for vehicles while maintaining excellent handling and steering, and in particular, to improvement of NVH characteristics by selective placement of active vibration dampers to cancel noise from the road.

2. Discussion of the Prior Art

The bushings and other interfaces between a vehicle body and suspension or body and frame in a vehicle suspension system strongly influence the vehicle's steering and handling performance, as well as its interior noise, vibration and harshness (NVH) characteristics. For example, if the bushings are relatively stiff, then the vehicle will have good steering and handling performance but poor NVH properties. On the other hand, if the bushings are relatively soft, then poor steering and handling results, but the vehicle has good interior NVH characteristics. Hence, good steering, handling and good NVH qualities have not been truly achieved for a vehicle, because of this adversarial relationship.

Active materials are materials that either actuate or sense when a stimulus is applied. Piezoelectrics are active materials that extend and contract when an electric field is applied, thereby acting as an actuator. In addition to being used as an actuator, piezoelectrics are used as sensors that emit a voltage when mechanically loaded. Magnetostrictives are active materials that extend in the presence of a magnetic field. Other active materials include magnetic shaped memory alloys that extend, bend, twist or contract when a magnetic field is applied.

Piezoelectric materials have been used in automobiles and airplanes for vibration absorption and noise suppression, in particular, in association with the engine. Unfortunately, known uses of piezoelectric materials in automobiles and other vehicles do not reduce noise transmitted to the interior of a vehicle through the bushings and other interfaces between the suspension and body or body and frame.

Therefore a need exists for a method and apparatus for improved steering, handling and NVH characteristics of a vehicle.

SUMMARY OF INVENTION

Accordingly, an object of the present invention is to provide an apparatus and method that provides improved NVH characteristics in a vehicle while providing excellent steering and handling.

Another object of the present invention is to selectively place vibration dampers such that steering, handling and NVH characteristics are improved in a vehicle.

In accordance with the invention, a noise reduction apparatus for a vehicle is provided. The noise reduction apparatus includes a vehicle suspension component adapted to be attached to one of a vehicle frame and a vehicle body. The vehicle suspension component, for example, a bushing of a control arm of a vehicle suspension, has a first characteristic that increases the vehicle steering, ride or handling capabilities. The vehicle suspension component has a second characteristic that increases the noise, vibration and harshness of the vehicle. The noise reduction apparatus includes an active vibration damper that counters noise, vibration and harshness from said vehicle suspension component. The active vibration damper preferably includes a piezoelectric component, a magnetostrictive component or a magnetic shaped alloy, excited in response to, and in a manner to counter, vibrations from the road.

A method in accordance with the invention includes providing a vehicle suspension component that affects noise, vibration, harshness, steering and handling. The vehicle suspension component is attached to a vehicle body or frame. An active vibration damper in accordance with the invention is placed at the interface between the vehicle suspension component and the body or frame.

BRIEF DESCRIPTION OF DRAWINGS

The foregoing objects, advantages, and features, as well as other objects and advantages, will become apparent with reference to the description and figures below, in which like numerals represent like elements and in which.

DETAILED DESCRIPTION

Figure 1:
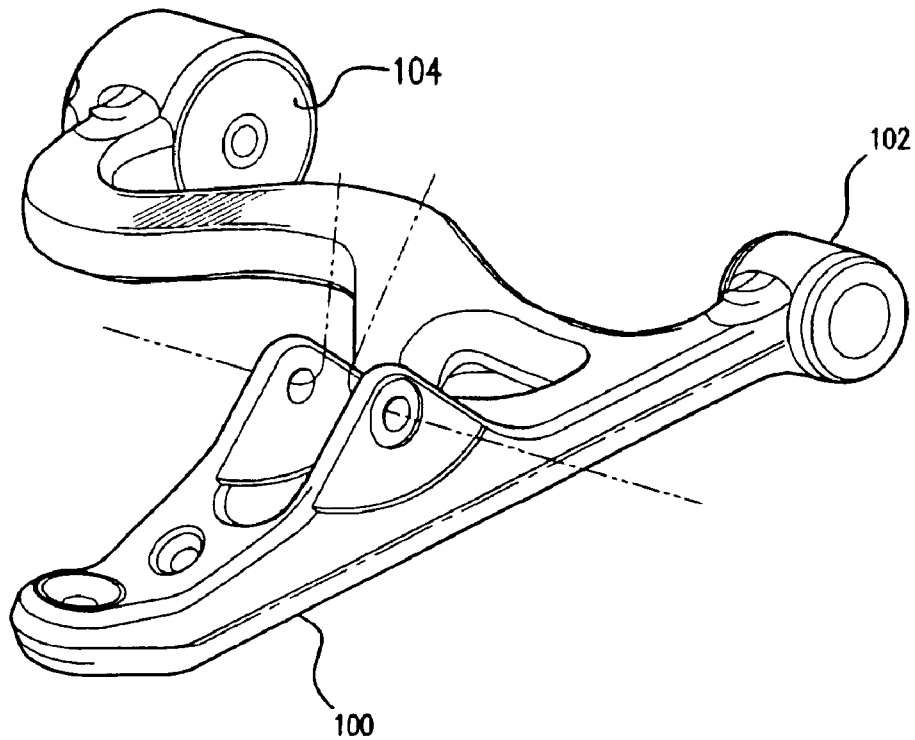
FIG. 1 is a perspective view of a control arm that couples a wheel of a vehicle to the body or frame of the vehicle.

FIG. 1 is a perspective view of a suspension control arm 100 for a motor vehicle. Suspension control arm 100 is used in coupling a wheel of a motor vehicle to the body of the motor vehicle. Road noise is transmitted through the suspension control arm 100 through connection point 102 and connection point 104. In particular, connection point 102 transmits a substantial percentage of the noise vibrations to the body of certain vehicles.

Figure 2:
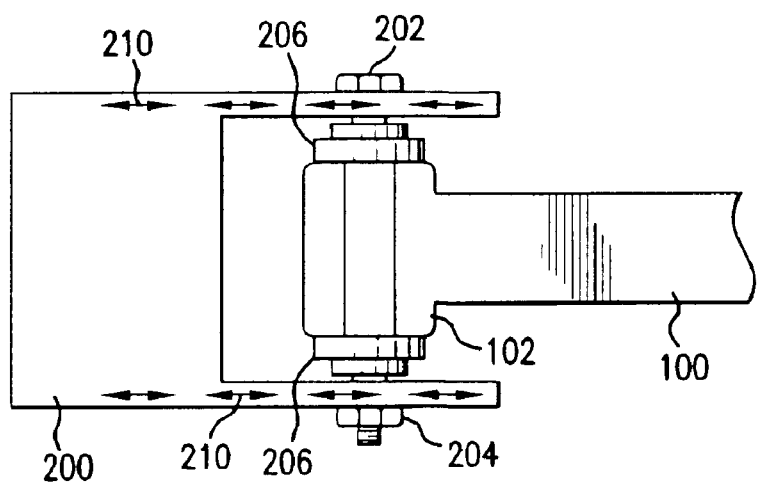
FIG. 2 is a top schematic view showing a prior art attachment point for a control arm to a cross member of a vehicle.

FIG. 2 is a top schematic view showing how connection point 102 of suspension control arm 100 is coupled to a cross member of a vehicle in accordance with the prior art. Connection point 102 is connected to the body of a vehicle through cross member 200. More specifically, a bolt 202 and nut 204 are used to couple control arm 100 to cross member 200. A bushing 206 is at the interface between cross member 200 and connection point 102. The bushing 206 affects the steering and handling performance and the NVH characteristics of the vehicle as discussed above.

Arrows 210 show the direction of vibrations transmitted to the cross member from suspension control arm 100. The vibrations of particular interests have a frequency range of about 100 to 230 Hertz and result in a maximum force and displacement of about 1 pound and about 0.00001 inches, respectively.

Figure 3:
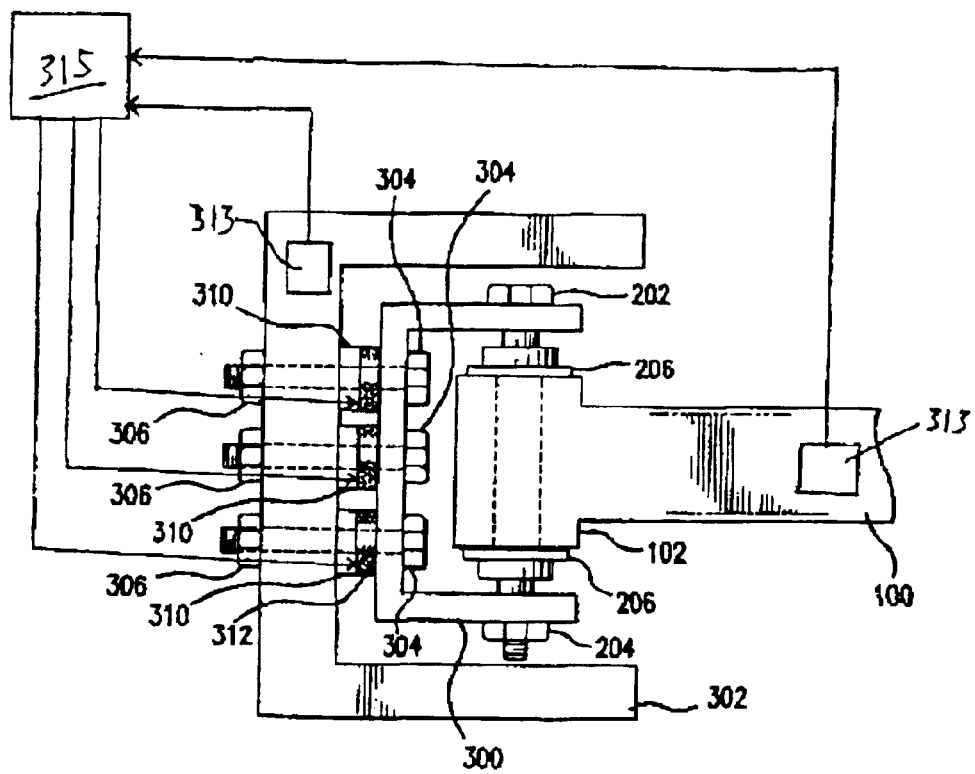
FIG. 3 is a top schematic view showing an attachment of a control arm to a cross member of a vehicle with a piezoelectric noise reduction apparatus in accordance with a preferred embodiment of the present invention.

FIG. 3 is a top schematic view showing an attachment of suspension control arm 100 to a cross member of a vehicle with a piezoelectric noise reduction apparatus in accordance with a preferred embodiment of the present invention. Suspension control arm 100 is mounted to a fixture 300. Fixture 300 is mounted to cross member 302 of the vehicle. Suspension control arm 100 is mounted to fixture 300 in a manner similar to that shown in FIG. 2. In particular, bolt 202 and nut 204 are used to fixedly mount and interface bushing 206 of control arm 100 to fixture 300. Fixture 300 is mounted to cross member 302 by the use of bolts 304 and nuts 306. In accordance with the invention, piezoelectric washers 310 are applied at the interface between fixtures 300 and cross member 302. More specifically, piezoelectric washers 310 receive bolts 304, which fixedly mount the fixture 300 to cross member 302. Most preferably, an elastic material 312 is used as a washer to interface with the piezoelectric washer 310. The piezoelectric washers 310 are stimulated electronically, in a known manner, to counter vibrations that transfer noise into the vehicle. Any suitable piezoelectric material is used for piezoelectric washers 310. A preferred piezoelectric material is the piezoceramic PZT (lead zirconate titanate). Elastic material 312 is preferably an elastomer, for example, polyurethane.

In operation, control arm 100 is vibrated by the wheel of the vehicle in response road conditions. The vibrations of interest from control arm 100 are sensed by any known means, such as by one or more accelerometers 313 mounted to the control arm and/or to the cross member 302 at appropriate locations. The accelerometers 313 generate electrical signals indicative of the sensed vibration and these signals are sent to an electronic control module, indicated schematically by reference number 315. Control module 315 receives the vibration signals from accelerometers 313 and produces a stimulating voltage that is sent to piezoelectric washers 310. The stimulating voltage has the correct characteristics to cause piezoelectric washers 310 to generate vibrations of opposite phase and the proper amplitude to counter the undesirable vibrations from control arm 100. The general method of an apparatus for sensing vibrations and generating a counter-vibration is well known in the active noise/vibration cancellation art. Piezoelectric washers 310 act as dampers to reduce noise and vibrations from being transmitted into the body of the vehicle.

Figure 4:
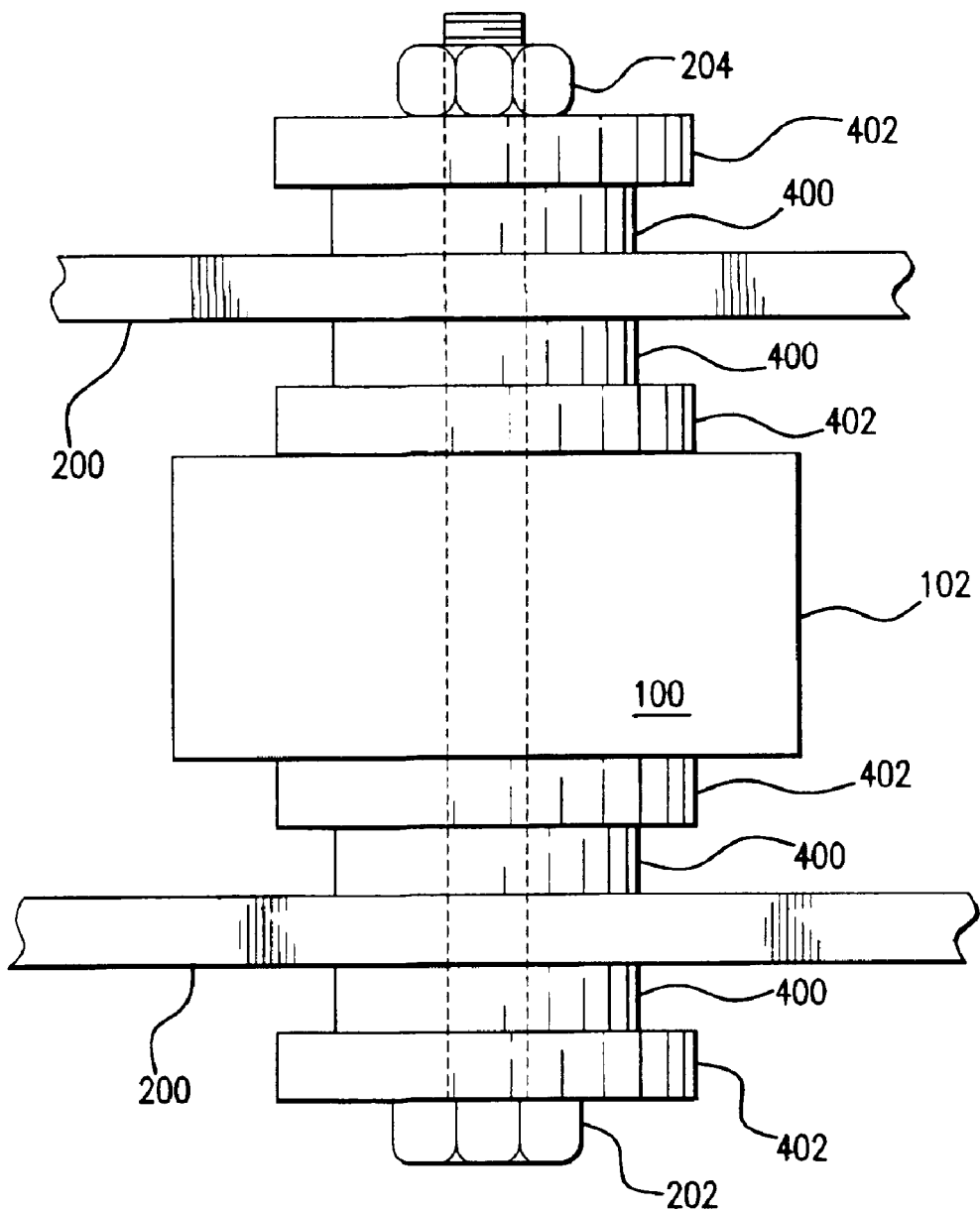
FIG. 4 is a top schematic view showing an attachment of a control arm to a cross member of a vehicle with a piezoelectric noise reduction apparatus in accordance with another preferred embodiment of the present invention.

As discussed above, FIG. 3 is an arrangement that requires the addition of fixture 300 to mount the control arm 100 to a cross member of a vehicle. FIG. 4 is a schematic view of an arrangement in accordance with the present invention where the attachment of the control arm 100 to the cross member does not require a fixture. In particular a piezoelectric noise reduction apparatus is directly applied at the attachment of the control arm to the cross member. More specifically, a plurality of piezoelectric washers 400 are stacked on bolt 202, which mounts the control arm to the cross member 200. The precise arrangement shown in FIG. 4 from a head of the bolt 202 to the nut 204 is a metal washer 402, a piezoelectric washer 400, an arm of cross member 200, a piezoelectric washer 400, a metal washer 402, connection point 102 of control arm 100, a metal washer 402, a piezoelectric washer 400, an arm of cross member 200, a piezoelectric washer 400, a metal washer 402 and nut 206. The piezoelectric washers 400 are electrically stimulated in a manner similar to that described above with respect to piezoelectric washers 310 in order to counter vibrations sensed from control arm 100. In an alternate embodiment, piezoelectric washers 400 are stacked adjacent each other touching end-to-end along bolt 202. Multiple, separately energizable piezoelectric elements may be used to achieve an increase in the amplitude and/or force output using the same amount of electrical energy input.

Figure 5:
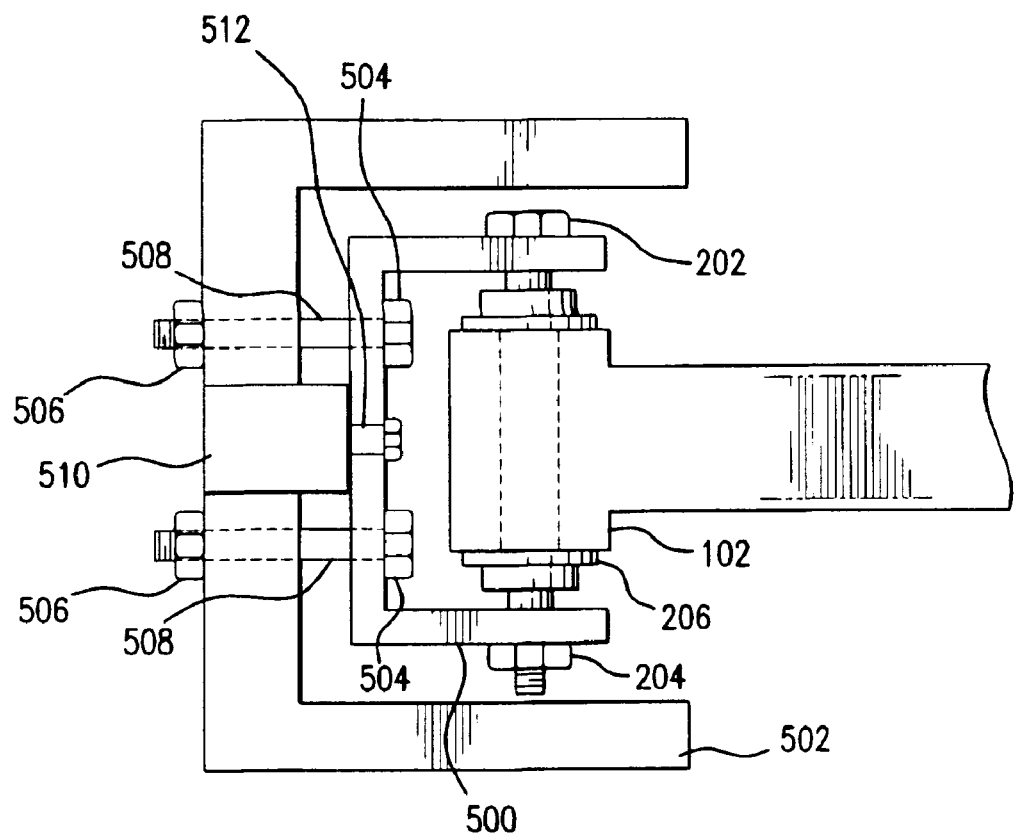
FIG. 5 is a top schematic view showing an attachment of a control arm to a cross member of a vehicle with a magnetostrictive noise reduction apparatus in accordance with another preferred embodiment of the present invention.

FIG. 5 is a top schematic view showing an attachment of the control arm 100 to a cross member of the vehicle with a magnetostrictive noise reduction apparatus in accordance with another preferred embodiment of the present invention. The apparatus shown in FIG. 5 is similar to the arrangement shown in FIG. 3. More specifically, a fixture 500 is used to couple connection point 102 to a cross member 502 of a vehicle body. The bolts 504 and nuts 506 are combined to fixedly mount fixture 500 to cross member 502. Washers 508 are applied at the interface between fixture 500 and cross member 502. In this preferred embodiment, rather than applying a piezoelectric element, a magnetostrictive actuator 510 is applied at the interface between fixture 500 and cross member 502. Pushrod 512 of magnetostrictive actuator 510 exhibits length and width changes in the presence of an applied magnetic field. These changes are used to counteract vibrations from control arm 100, thereby preventing transmission of the associated vibrations and noise into the body of the vehicle. Any suitable magnetostrictive actuator may be used. A preferred magnetostrictive actuator includes Terfenol-d magnetostrictive material.

Figure 6:
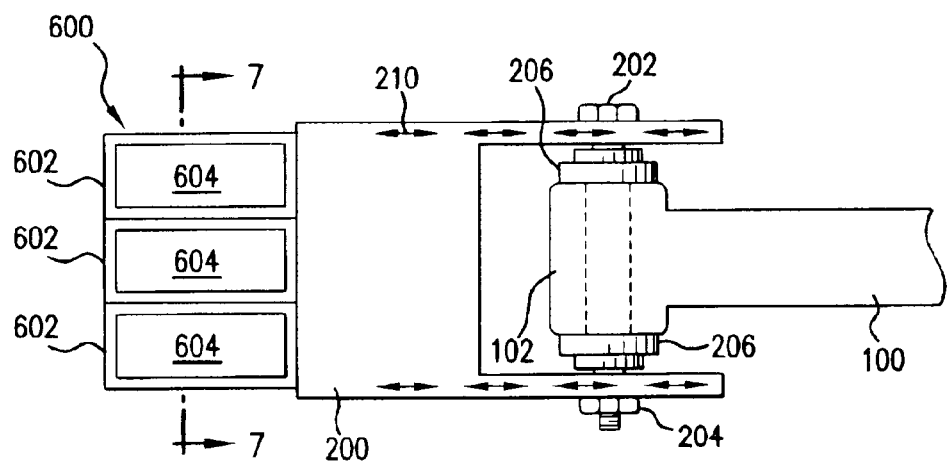
FIG. 6 is a top schematic view showing an attachment of a control arm to a cross member of a vehicle with a piezoelectric noise reduction apparatus in accordance with another preferred embodiment of the present invention.
Figure 7:
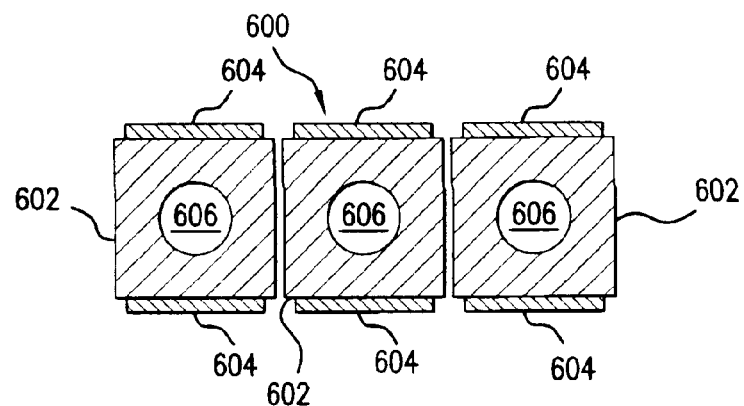
FIG. 7 is a sectional view of the piezoelectric noise reduction apparatus of FIG. 6 taken along line 7—7 of FIG. 6.

FIG. 6 is a top schematic view of yet another preferred embodiment of a noise reduction apparatus in accordance with the present invention. FIG. 7 is a schematic sectional view of the apparatus shown in FIG. 6, the sectional view being taken along line 7—7. FIG. 6 shows an arrangement similar to the arrangement shown in FIG. 2, except that a noise reduction apparatus 600 is added at the interface between the cross member 200 and the vehicle body (not shown). Notably, control arm 100 is mounted to cross member 200 in the manner shown in FIG. 2. Noise reduction apparatus 600 includes a plurality of sleeves 602. Each sleeve 602 includes piezoelectric material 604. Preferably, piezoelectric material 604 is mounted on a top and a bottom portion of sleeves 602. Sleeves 602 are shown with a square cross section. However, any of a number of configurations including a hexagonal cross section may be used. Sleeves 602 include a bore 606 that may be used for receiving a bolt. Sleeves 602 are preferably aluminum. Though shown as one contiguous material in FIG. 6, piezoelectric material 604 may alternatively be a plurality of separate piezoelectric components stacked adjacent each other such that one piezoelectric component touches at least one other piezoelectric component. Also, the piezoelectric material 604 may cover and extend around the entire surface of sleeve 602. The exact configuration of the piezoelectric elements is determined by the required force and amplitude characteristics required for a specific application.

In operation, piezoelectric material 604 is stimulated to expand and contract in response to sensed vibrations of control arm 100 such that the piezoelectric material 604 counteracts and reduces vibration and noise that is transmitted to the vehicle body.

Figure 8:
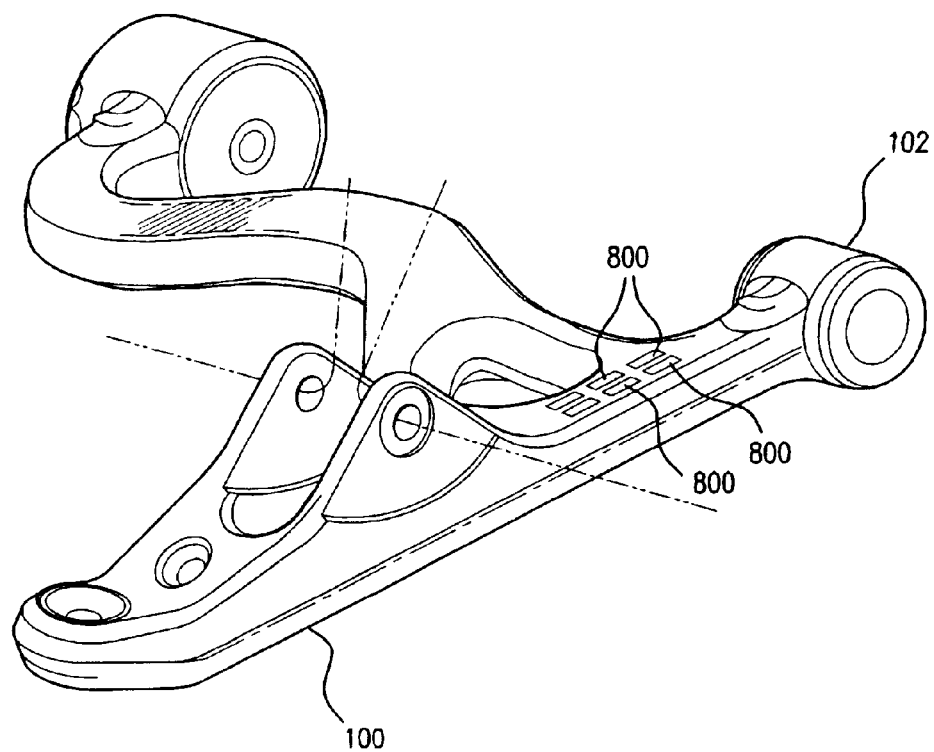
FIG. 8 is a perspective view showing a surface mounted piezoelectric noise reduction apparatus on a control arm in accordance with another preferred embodiment of the present invention.

FIG. 8 is a perspective view of control arm 100 including another preferred embodiment of a noise reduction apparatus in accordance with the present invention. More specifically, a plurality of piezoelectric material blocks 800 are mounted on a surface of control arm 100 in an area adjacent to connection point 102. The preferred piezoelectric material blocks 800 are ceramic. Most preferably, piezoelectric blocks 800 are mounted to control arm 100 using epoxy, or another adhesive. As with the other embodiments shown and discussed herein, the piezoelectric materials are stimulated in response to sensed vibrations of control arm 100 to expand or contract to counter the vibrations on control arm 100 and prevent the transmission of such vibrations and noise into the vehicle body.

Figure 9:
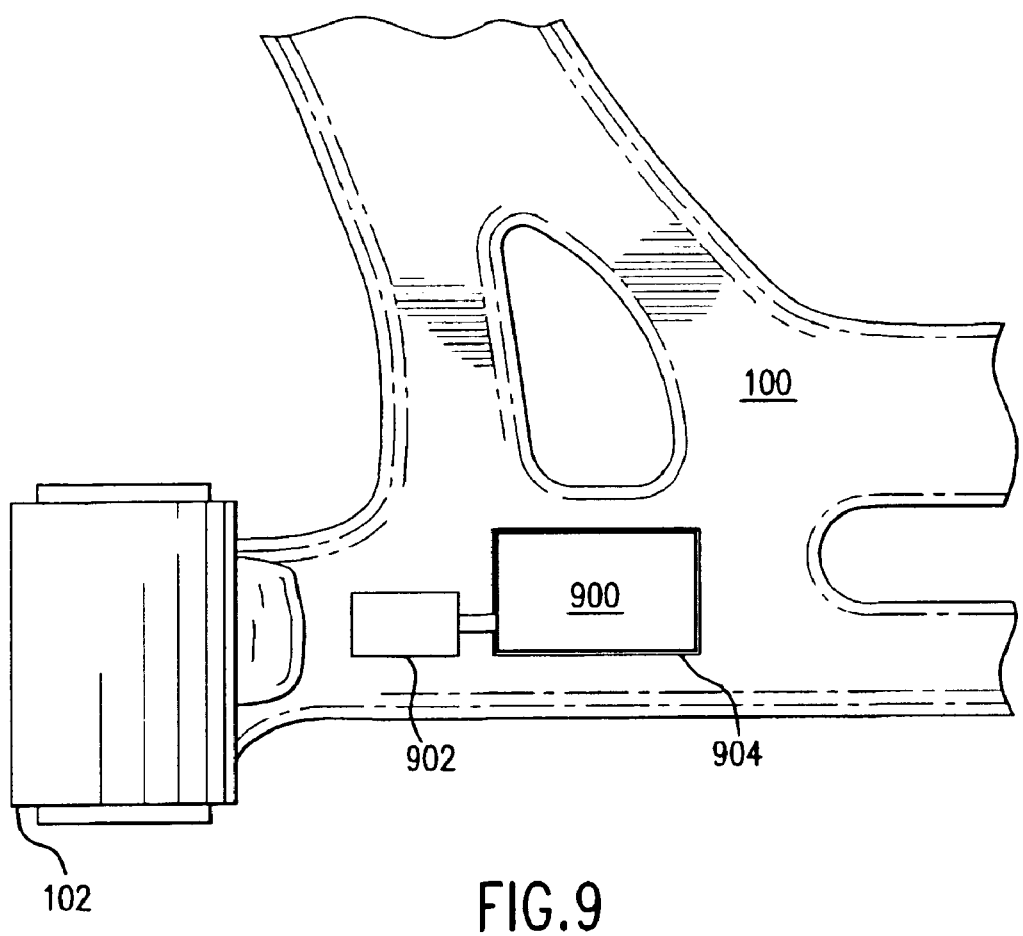
FIG. 9 is a top schematic view of a magnetostrictive noise reduction apparatus in accordance with another preferred embodiment of the present invention.

FIG. 9 is a perspective view of control arm 100 including another preferred embodiment of a noise reduction apparatus in accordance with the present invention. More specifically, a noise reduction apparatus, including a block 900 and a magnetostrictive actuator 902, is mounted on a surface of control arm 100 in an area adjacent to connection point 102. Block 900 is preferably an aluminum block with an opening for receiving a push rod of magnetostrictive actuator 902. Block 900 is preferably bolted to control arm 100 in an area on the surface of the control arm that includes a milled indentation 904 adapted to receive block 900. Magnetostrictive actuator 904 is similar to magnetostrictive actuator 510 shown in, and discussed above with respect to, FIG. 5. As with the other embodiments shown and discussed herein, the magnetostrictive actuator is stimulated in response to vibrations of control arm 100 to expand or contract to counter the vibrations on control arm 100 and prevent the transmission of such vibrations and noise into the vehicle body.

Additional suspension points on a vehicle where noise reduction apparatuses in accordance with the invention are applied include a shock absorber, a frame mounting, a strut, and a stabilizer bar.

As discussed above, the present invention provides an effective method an apparatus for improving the noise, vibration and harshness (NVH) characteristics of a vehicle. In contrast to prior apparatus and methods, the improved NVH characteristics are achieved without sacrifice in steering and handling.

The above-described embodiments of the invention are provided purely for purposes of example. Many other variations, modifications, and applications of the invention may be made.

What is claimed is:

1. A noise reduction apparatus in a vehicle, the noise reduction apparatus comprising:
    a vehicle suspension component adapted to be attached to one of a vehicle frame and a vehicle body;
    said vehicle suspension component having a first characteristic that increases the vehicle steering, ride or handling capabilities;
    said vehicle suspension component having a second characteristic that increases the noise, vibration and harshness of the vehicle; and
    an active vibration damper that counters noise, vibration and harshness from said vehicle suspension component.

2. The apparatus of claim 1 wherein the active vibration damper includes one of a piezoelectric element, a magnetostrictive element, and a magnetic shaped alloy.

3. The apparatus of claim 1 wherein the vehicle suspension component includes one of a control arm, a bushing, a shock absorber, a frame mounting, a strut, and a stabilizer bar.

4. The apparatus of claim 1 wherein the vehicle suspension component is a control arm with a bushing at a connection point; and
    wherein the control arm is mounted to a fixture and the fixture is mounted to a cross member of the vehicle and a piezoelectric element is attached at an interface between the fixture and the cross member.

5. The apparatus of claim 1 wherein the vehicle suspension component is a control arm with a bushing at a connection point;
    wherein the control arm is attached at the connection point to a cross member of a vehicle by a bolt inserted through the bushing; and
    wherein the active vibration damper includes a plurality of piezoelectric washers on the bolt.

6. The apparatus of claim 1 wherein the vehicle suspension component is a control arm with a bushing at a connection point;
    wherein the control arm is mounted to a fixture at the connection point and the fixture is mounted to a cross member of the vehicle and a magnetostrictive element is attached at an interface between the fixture and the cross member.

7. The apparatus of claim 1 wherein the vehicle suspension component is a control arm with a bushing at a connection point;
    wherein the control arm is attached at the connection point to a cross member of a vehicle;
    wherein the active vibration dampers includes a plurality of sleeves between the cross member and one of a body and frame of the vehicle; and
    wherein each sleeve of the plurality of sleeves includes piezoelectric material.

8. The apparatus of claim 7 wherein the each sleeve includes a strip of piezoelectric material attached to a first side of the each sleeve and a strip of piezoelectric material attached to another side opposite the first side, said piezoelectric material being stimulated to counter vibrations from the cross member.

9. The apparatus of claim 7 wherein the piezoelectric material comprises a stack of a plurality of piezoelectric components adjacent each other with one piezoelectric component touching another piezoelectric component.

10. The apparatus of claim 1 wherein the active vibration damper includes at least one piezoelectric element that is mounted on a surface of the vehicle suspension component.

11. The apparatus of claim 1 wherein the vehicle suspension component is a control arm and the active vibration damper is mounted on a surface of the control arm and includes a magnetostrictive actuator.

12. A method for noise reduction in a vehicle comprising the steps of:
    providing a vehicle suspension component having a first characteristic that increases vehicle steering, ride or handling capabilities;
    attaching an active vibration damper at an interface where the vehicle suspension component attaches to one of a vehicle frame and a vehicle body.

13. The method of claim 12 wherein the active vibration damper comprises one of a piezoelectric element, magnetostrictive element and a memory shaped alloy.

14. The method of claim 12 further comprising the step of exciting the active vibration damper in response to vibrations at the vehicle suspension component.

15. The method of claim 12 wherein the vehicle suspension component includes one of a control arm, a bushing, a shock absorber, a frame mounting, a strut, and a stabilizer bar.

16. A vehicle suspension system with a road noise reduction apparatus, the vehicle suspension system comprising:

a frame of a vehicle;

a vehicle suspension component adapted to be attached to the frame;

said vehicle suspension component having a first characteristic that increases the vehicle steering, ride or handling capabilities;

said vehicle suspension component having a second characteristic that increases the noise, vibration and harshness of the vehicle; and an active vibration damper that counters noise, vibration and harshness from said vehicle suspension component.

17. The system of claim 16 wherein the active vibration damper includes one of a piezoelectric element, a magnetostrictive element, and a magnetic shaped alloy.

18. The apparatus of claim 16 wherein the vehicle suspension component includes one of a control arm, a bushing, a shock absorber, a frame mounting, a strut, and a stabilizer bar.

19. The apparatus of claim 16 wherein the vehicle suspension component is a control arm with a bushing at a connection point; and wherein the control arm is mounted to a fixture and the fixture is mounted to a cross member of the vehicle and a piezoelectric element is attached at an interface between the fixture and the cross member.

* * * * *